United States Patent [19]
Dixit et al.

[11] Patent Number: 5,574,877
[45] Date of Patent: Nov. 12, 1996

[54] TLB WITH TWO PHYSICAL PAGES PER VIRTUAL TAG

[75] Inventors: Ashish B. Dixit, Union City; Earl A. Killian, Los Altos, both of Calif.

[73] Assignee: Silicon Graphics, Inc., Mountain View, Calif.

[21] Appl. No.: 951,471

[22] Filed: Sep. 25, 1992

[51] Int. Cl.[6] ................................................. G06F 12/10
[52] U.S. Cl. ........................................ 395/417; 395/419
[58] Field of Search .................................. 395/400, 425, 395/417, 419

[56] References Cited

U.S. PATENT DOCUMENTS

| | | | |
|---|---|---|---|
| 4,622,653 | 11/1986 | McElroy | 365/49 |
| 4,942,521 | 7/1990 | Hanawa et al. | 395/455 |
| 5,226,133 | 7/1993 | Taylor et al. | 395/417 |
| 5,263,140 | 11/1993 | Riordan | 395/417 |
| 5,287,475 | 2/1994 | Sawamoto | 395/402 |

*Primary Examiner*—Jack A. Lane
*Attorney, Agent, or Firm*—Sterne, Kessler, Goldstein & Fox P.L.L.C.

[57] ABSTRACT

A TLB which has at least two page frame numbers (PFN) associated with each tag (Virtual Page Number) is provided. Thus, a match will produce two possible physical page frame numbers. The selection between these two is controlled by a bit provided directly from the virtual address, without translation. This bit is preferably the least significant bit of the virtual page number, or the first bit after the physical offset. This structure effectively doubles the capacity of the TLB without doubling the number of tags. Although the virtual space covered by each tag or VPN is necessarily restricted to two contiguous areas, the invention allows these two contiguous areas to be mapped to completely different regions of the physical address space. In addition to limiting the number of tags required, the number of comparators required is also similarly limited, with only the number of physical page frame numbers stored being required to double.

8 Claims, 6 Drawing Sheets

CONTIGUOUS VIRTUAL
ADDRESS SPACE

2 DISCONTIGUOUS BLOCKS
OF PHYSICAL SPACE

32-BIT ADDRESSING

64-BIT ADDRESSING

FIG. 7
PAGEMASK REGISTER

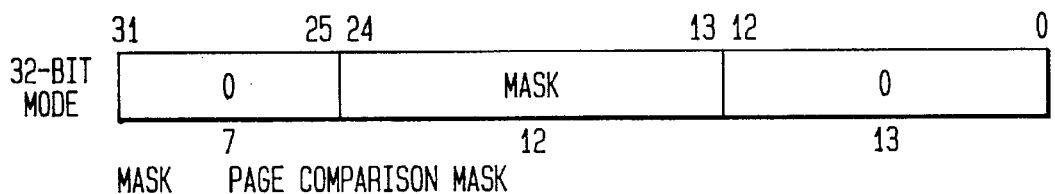

MASK   PAGE COMPARISON MASK

FIG. 8
ENTRYHI REGISTER

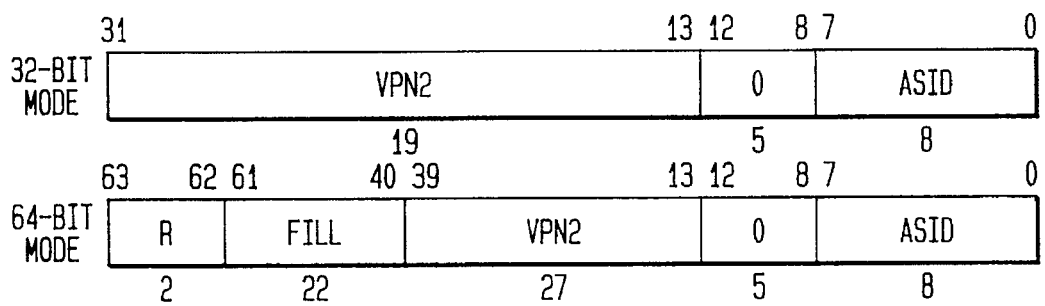

VPN2   VIRTUAL PAGE NUMBER DIVIDED BY TWO (MAPS TO TWO PAGES).
ASID   ADDRESS SPACE ID FIELD. AN 8-BIT FIELD WHICH LETS MULTIPLE PROCESSES SHARE THE TLB WHILE EACH PROCESS HAS A DISTINCT MAPPING OF OTHERWISE IDENTICAL VIRTUAL PAGE NUMBERS.
R      REGION. (00 → USER, 01 → SUPERVISOR, 11 → KERNEL) USED TO MATCH $vADDR_{63...62}$.
FILL   RESERVED. MUST BE THE SAME AS BIT 63 OF THE REGISTER WHEN WRITTEN.

FIG. 9
ENTRYLo0 AND ENTRY Lo1

| 32-BIT MODE | 31 | 30 29 | | 6 | 5 3 | 2 | 1 | 0 |
|---|---|---|---|---|---|---|---|---|
| | 0 | | PFN | | C | D | V | G |
| | 2 | 24 | | | 3 | 1 | 1 | 1 |

| 32-BIT MODE | 31 | 30 29 | | 6 | 5 3 | 2 | 1 | 0 |
|---|---|---|---|---|---|---|---|---|
| | 0 | | PFN | | C | D | V | G |
| | 2 | 24 | | | 3 | 1 | 1 | 1 |

| 64-BIT MODE | 63 | 30 29 | | 6 | 5 3 | 2 | 1 | 0 |
|---|---|---|---|---|---|---|---|---|
| | 0 | | PFN | | C | D | V | G |
| | 34 | 24 | | | 3 | 1 | 1 | 1 |

| 64-BIT MODE | 63 | 30 29 | | 6 | 5 3 | 2 | 1 | 0 |
|---|---|---|---|---|---|---|---|---|
| | 0 | | PFN | | C | D | V | G |
| | 34 | 24 | | | 3 | 1 | 1 | 1 |

PFN    PAGE FRAME NUMBER. UPPER BITS OF THE PHYSICAL ADDRESS.
C    SPECIFIES THE CACHE ALGORITHM TO BE USED.
D    DIRTY. IF THIS BIT IS SET, THE PAGE IS MARKED AS DIRTY AND, THEREFORE, WRITABLE. THIS BIT IS ACTUALLY A WRITE-PROTECT BIT THAT SOFTWARE CAN USE TO PREVENT ALTERATION OF DATA.
V    VALID. IF THIS BIT IS SET, IT INDICATES THAT THE TLB ENTRY IS VALID; OTHERWISE, TLBL OR TLBS MISS OCCURS.
G    GLOBAL. IF THIS BIT IS SET IN BOTH Lo0 AND Lo1, THEN IGNORE THE ASID DURING TLB LOOKUP.
0    RESERVED. MUST BE WRITTEN AS ZEROES, RETURNS ZEROES WHEN READ.

TLB WITH TWO PHYSICAL PAGES PER VIRTUAL TAG

BACKGROUND

The present invention relates to the architecture of translation look-aside buffers (TLBs).

A TLB is used to translate a virtual address generated by a program to an actual physical address applied to memory. It is especially useful in systems where multiple programs run, since each program typically will like to start at address zero. The TLB allows the mapping of separate programs to separate areas of memory, while each program thinks it is operating in the same space starting at zero.

Some computer systems, such as those produced by Intel, do other processing of the memory addresses as well. For instance, Intel does what is similar to a two-level TLB translation, with the first level being called a segment. The segment is provided to a segment descriptor table and translated into an intermediate address referred to as a "linear" address. For purposes of this application, the references in the description and the claims to virtual and physical refer to the input and output side of an address translation, whether it be from virtual to linear, linear to physical, or otherwise. A description of the Intel system can be found in U.S. Pat. No. 4,972,338.

The TLB is essentially a table which is stored in memory. Like other aspects of memory, the TLB is typically at least partially stored on the microprocessor chip itself in the form of a cache memory. Thus, when the TLB translation is done, there is first an attempt to do it through the on-chip TLB cache. If there is no hit there, the TLB translation is done through the full table stored in memory or the missing entry is brought into the on-chip TLB.

Since the TLB is used to translate virtual addresses into physical addresses, its structure necessarily has a set of virtual addresses, or tags, associated with all mappable virtual addresses. Associated with each tag is a portion of the physical address corresponding to the page of the physical address, referred to herein as the page frame number (PFN). The location within a particular physical page is determined by the offset portion of the original virtual address. This offset is not translated, and is used directly from the original virtual address. The virtual tags are referred to herein as virtual page numbers (VPN). The TLB will compare its stored VPNs to the appropriate portion of a virtual address to determine if there is a hit in the TLB cache.

There are three types of cache memory organization. These are (1) fully associative mapping, (2) direct mapping, and (3) set-associative mapping. Most TLBs are fully associative, which means that the virtual addresses generated are compared against all tag entries of the TLB to determine if a match exists. This is typically done by using multiple comparators, with each comparator having a corresponding tag as one input, and the generated virtual address being provided to the other input of all the comparators. The comparator which produces a match output shows where there is a hit. The physical page frame number (PFN) corresponding to that tag which produces a hit can then be used for the translation. If there is no hit in the cache, main memory is then accessed for the full TLB table.

In a direct mapping cache, each tag is assigned a permanent, set location in the cache. For instance, every 48th virtual address location may be assigned to the first tag position in the cache. When any virtual address is generated, it is compared only against the tag position at which the tag should be located if it is present in the cache. Thus, only a single comparator need be used, limiting the amount of hardware, with the appropriate tag position being selected. Set-associative mapping is essentially a combination of the two, with the tags being allowed to be in more than one, but a limited number, of cache locations. A virtual address might then be compared against a pair of possible tag locations, for instance, rather than just one.

Memory addressing schemes used in some systems, such as those of Mips Computer Systems, Inc., use an address space identifier (ASID) associated with each program. This is a separate field used with the virtual address to identify the process it is associated with. Instead of an ASID address, a particular virtual address may instead have its global bit (G Bit) set to indicate that the virtual address applies to global functions, and is not restricted to any one process or program.

SUMMARY OF THE INVENTION

The present invention provides a TLB which has at least two page frame numbers (PFN) associated with each tag (Virtual Page Number). Thus, a match will produce two possible physical page frame numbers. The selection between these two is controlled by a bit provided directly from the virtual address, without translation. This bit is preferably the least significant bit of the virtual page number, or the first bit after the physical offset.

The structure of the present invention effectively doubles the capacity of the TLB without doubling the number of tags. Although the virtual space covered by each tag or VPN is necessarily restricted to two contiguous areas, the invention allows these two contiguous areas to be mapped to completely different regions of the physical address space. In addition to limiting the number of tags required, the number of comparators required is also similarly limited, with only the number of physical page frame numbers stored being required to double.

The two physical PFNs per virtual tag require additional structure to deal with the global bit. When the two PFNs are initially stored in the TLB cache, their global bits are ANDed together to provide a global bit indication which is stored with the virtual page number or tag.

For a fuller understanding of the nature and advantages of the invention, reference should be made to the ensuing detailed description taken in conjunction with the accompanying drawings.

BRIEF DESCRIPTION OF THE DRAWINGS

FIG. 7 illustrates the format of the page mask register;

FIG. 8 illustrates the format of the entryHi register in both 32-bit and 64-bit mode; and FIG. 9 illustrates the formats for the dual EntryLo 0 and EntryLo 1 registers for both 32-bit and 64-bit mode.

DETAILED DESCRIPTION OF THE PREFERRED EMBODIMENT

Figure 1:
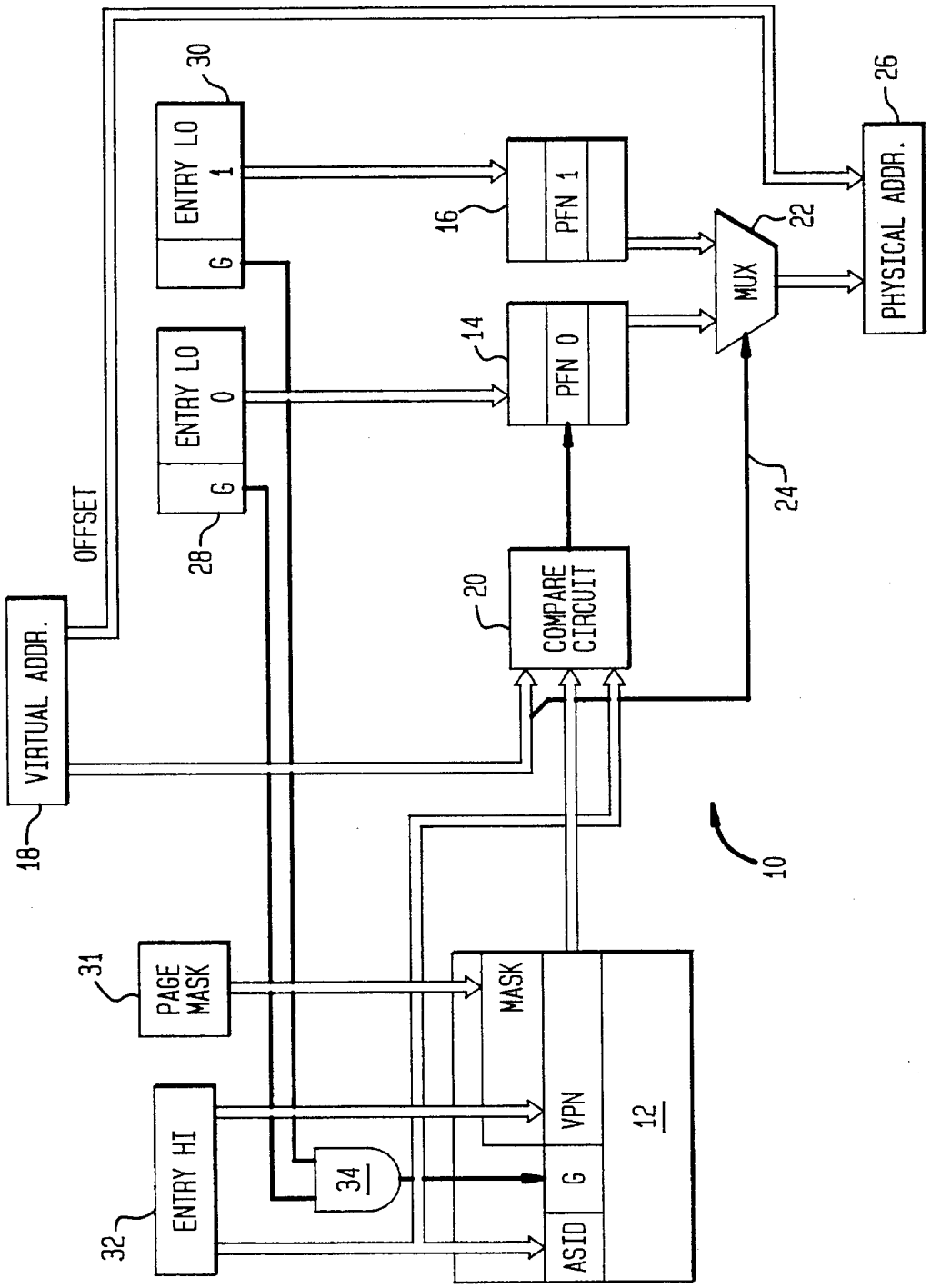
FIG. 1 is a block diagram of the TLB architecture according to one embodiment of the present invention.

FIG. 1 is a block diagram of a TLB 10 according to one embodiment of the present invention. A tag memory 12 stores 48 VPN or tag entries which correspond to 48 pairs, or 96, PFN or physical entries in cache blocks 14 and 16. A virtual address from a virtual address register 18 is compared with each tag entry in comparison circuitry 20 (along with a comparison of the ASID and G bit discussed below). A match will select a pair of PFNs from cache blocks 14 and 16. These pair of PFNs will be provided to a multiplexer 22. The least significant bit of the VPN from register 18 is provided to a select input 24 of multiplexer 22 to select one of the two PFNs to be provided to a physical address register 26. The offset portion of the virtual address from register 18 is provided directly to the physical address register.

Figure 2:
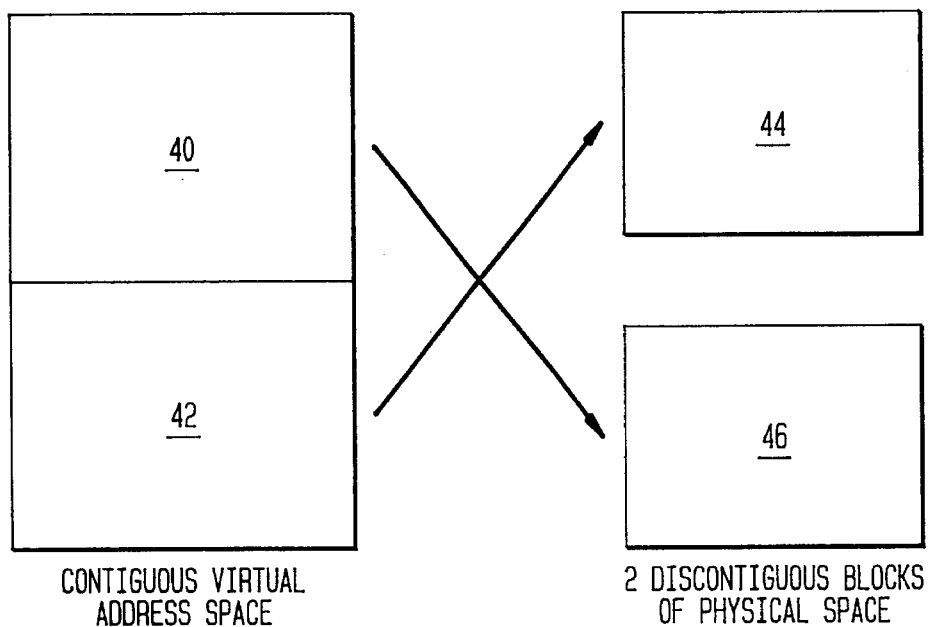
FIG. 2 is a diagram illustrating the mapping to two discontiguous blocks of physical space.

Since only 48 VPNs are stored, and the least significant bit of the VPN is used to distinguish between the two PFNs, a VPN stored corresponds to two contiguous blocks of address space 40 and 42 as shown in FIG. 2. But, since the LSB of the virtual address can select between the two PFNs, these PFNs can be used to refer to two discontiguous blocks of physical space 44 and 46 as illustrated in FIG. 2.

Returning to FIG. 1, the loading of the data is performed through two entryLO registers 28 and 30 and an entryHI register 32 for the tag. The entryLO registers each contain a global bit, G, which is ANDed together in an AND gate 34 and provided to the G position in the format of the tag in tag memory 12. The remaining fields of the tag entries, the VPN and the ASID, are provided from entryHI register 32.

Figure 3:
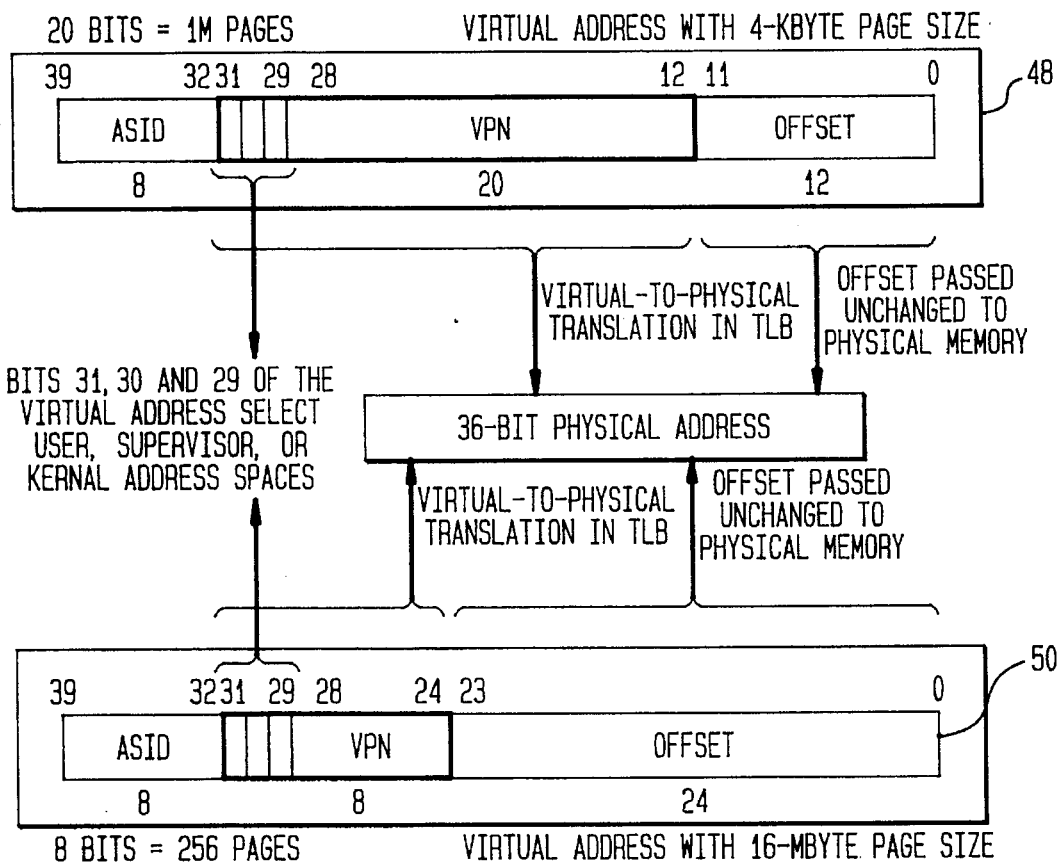
FIG. 3 shows the 32-bit virtual address format for 4-Kbyte and 16-Mbyte page sizes.

FIG. 3 illustrates, for a 32-bit virtual address, the different address fields. In a first format 48, a four kilobyte (KBYTE) page size is used. This gives a 12-bit offset which is used directly for the physical address, along with a 20-bit VPN. Bits 31, 30 and 29 of the virtual address are used to select among a user, supervisor, or kernel address space. The user space is a typical application program, while the supervisor and kernel would be equivalent to different levels of an operating system. The ASID bits identify a particular process or application program. Format 50 illustrates the same virtual address for a 16-megabyte (MBYTE) page size. As can be seen, the offset has 20 bits here, with only an 8-bit VPN. Thus, there is a larger page size, but fewer pages than in format 48.

Figure 4:
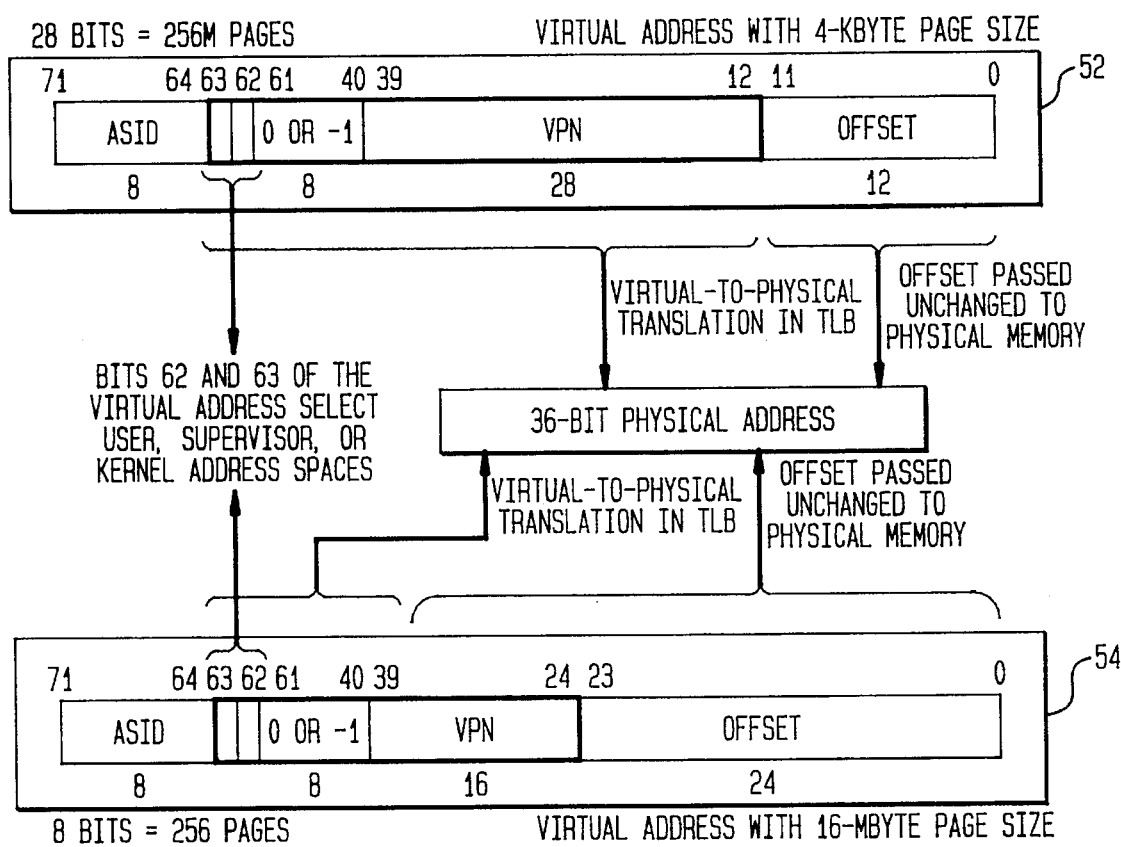
FIG. 4 shows the 64-bit virtual address format for 4-Kbyte and 16-Mbyte page sizes.

FIG. 4 illustrates similar formats 52 and 54 for a 64-bit virtual address.

Figure 5:
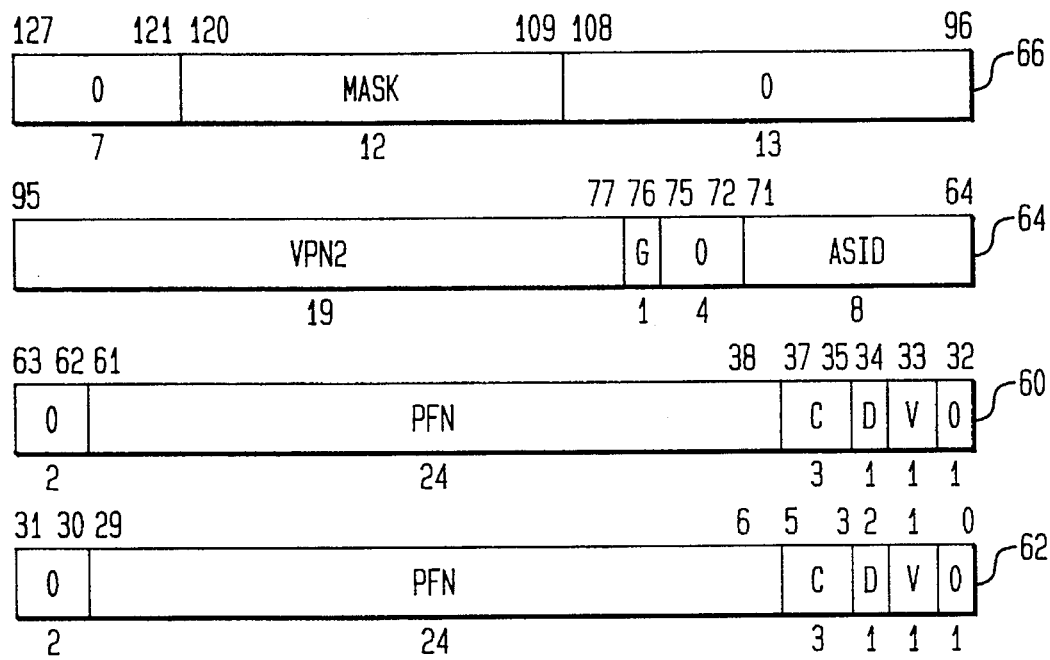
FIG. 5 illustrates both the tag and physical page frame number formats for the TLB with 32-bit addressing.

FIG. 5 illustrates the actual contents of the tag and physical address portion of the TLB of FIG. 1 for 32-bit addressing. Formats 60 and 62 are the two identical formats for the pair of page frame numbers (PFN). As can be seen, there is a 24-bit PFN, followed by a 3-bit field designated "C". This field specifies a cache algorithm to be used. The C-bits select among a number of cache coherency algorithms. This is followed by a dirty bit (D) which, if set, indicates that the page is marked as dirty, and therefore writable. This is actually a write-protect bit that software can use to prevent alteration of data. The D-bit is followed by the valid bit (V) which, if set, indicates that the TLB entry is valid. Otherwise, a miss will occur. The last zero bit is reserved.

The tag format includes formats 64 and 66. Format 66 includes the virtual page number field, followed by the global bit and four reserve bits which are set to zero. This is followed, in turn, by the ASID field. Format 66 has 12 mask bits surrounded by reserve fields. The mask bits are used to set the page size to be used between the 4-K byte and 16-M byte pages indicated in FIGS. 3 and 4. By masking out the appropriate number of bits of the VPN, the appropriate page size is selected and used.

Figure 6:
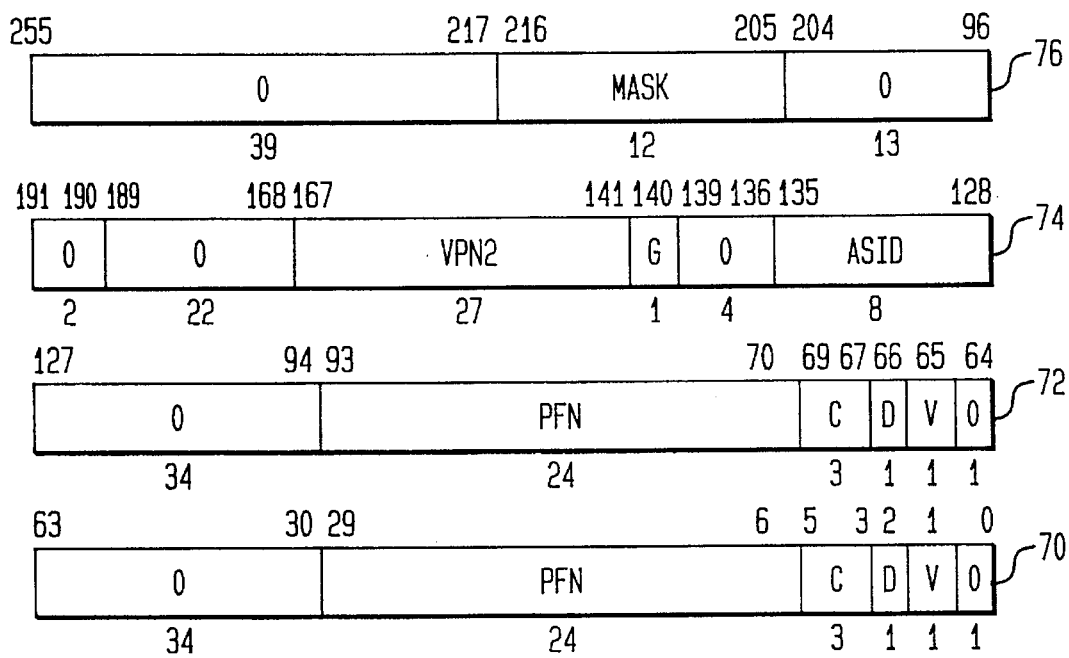
FIG. 6 illustrates the tag and PFN formats in the TLB cache for 64-bit addressing.

FIG. 6 shows corresponding page frame number formats 70 and 72, VPN format 74 and mask format 76 for 64-bit addressing.

FIG. 7 illustrates the contents of the page mask register 31 of FIG. 1.

FIGS. 8 and 9 illustrate the contents of the entryHI and entryLO registers 32, 28 and 30 of FIG. 1.

As will be understood by those familiar with the art, the present invention may be embodied in other specific forms without departing from the spirit or essential characteristics thereof. For example, two bits of the virtual address can be used to select from four PFNs for a single VPN. In addition, the LSB or the two LSBs for selecting the right PFN could instead be placed at any other location within the virtual address. In addition, the TLB cache could be direct-mapped or set-associative, rather than fully associative. Also, address could be provided from the virtual address bus and to the physical address bus without using registers. Accordingly, the disclosure of the preferred embodiment of the invention is intended to be illustrative, but not limiting, of the scope of the invention which is set forth in the following claims.

What is claimed is:

1. A translation lookaside buffer (TLB) comprising:

a tag memory having a plurality of virtual address tag entries;

a cache memory having at least a pair of physical addresses corresponding to each of said virtual address tag entries;

a virtual address bus;

a comparison circuit having inputs coupled to said virtual address bus and outputs of said tag memory and having match outputs for selecting one of said pair of said physical addresses upon a match, expanding the virtual space covered by each of said virtual address tag entries to two spaces containing said one of said pair of said physical addresses, and allowing said two spaces to map to two discontiguous blocks of physical space; and selection means, coupled to said cache memory, for selecting a single address from said one of said pair of physical addresses in response to at least one bit from said virtual address bus.

2. The TLB of claim 1 wherein said at least one bit from said virtual address bus is a least significant bit of a virtual page number of said virtual address, said least significant bit distinguishing between two contiguous blocks of virtual address space.

3. The TLB of claim 1 wherein each of said virtual address tag entries comprises a virtual page number and an address space identifier (ASID), said ASID identifying a program to which said virtual page number corresponds, said comparison means comparing said ASID to a current ASID for a current program.

4. The TLB of claim 1 further comprising:

first and second registers for storing a physical frame number to be written into said cache memory as a pair, each of said registers including a global bit for indicating whether the physical number of said register corresponds to a particular program or globally applies to all programs; and logic means, coupled to said global bit of said registers, for performing a logical AND of said global bits, an output of said logic means being provided to a global bit position in said tag memory at an entry corresponding to said physical frame numbers in said cache memory, said output of said logic means indicating whether an adddress space identifier (ASID), which is present in said tag memory and used to identify an associated program, should be ignored.

5. The TLB of claim 1 wherein said selection means comprises a multiplexer.

6. The TLB of claim 1 further comprising a page mask register coupled to said tag memory, said page mask register including a plurality of mask bits that are used to mask out an appropriate number of bits of a select virtual address tag entry to select a page size.

7. A translation lookaside buffer (TLB) comprising:

a tag memory having a plurality of virtual address tag entries, each of said virtual address tag entries including a virtual page number and an address space identifier (ASID), said ASID identifying a program to which said virtual page number corresponds;

a cache memory having at least a pair of physical addresses corresponding to each of said virtual address tag entries;

a virtual address bus;

a comparison circuit having inputs coupled to said virtual address bus and outputs of said tag memory and having match outputs for selecting one of said pair of said physical addresses upon a match, expanding the virtual space covered by each of said virtual address tag entries to two spaces containing said one 0f said pair of said physical addresses, and allowing said two spaces to map to two discontiguous blocks of physical space;

selection means, coupled to said cache memory, for selecting a single address from said one of said pair of physical addresses in response to a least significant bit of a virtual page number of said virtual address, said least significant bit distinguishing between two contiguous blocks of virtual address space;

first and second registers for storing a physical frame number to be written into said cache memory as a pair, each of said registers including a global bit for indicating whether the physical number of said register corresponds to a particular program or globally applies to all programs; and logic means, coupled to said global bit of said registers, for performing a logical AND of said global bits, an output of said logic means being provided to a global bit position in said tag memory at an entry corresponding to said physical frame numbers in said cache memory, said output of said logic means indicating whether a corresponding ASID, which is present in said entry corresponding to said physical frame numbers, should be ignored.

8. The TLB of claim 7 further comprising a page mask register coupled to said tag memory, said page mask register including a plurality of mask bits that are used to mask out an appropriate number of bits of a select virtual page number to select a page size.

* * * * *